(12) United States Patent
Kawahara et al.

(10) Patent No.: US 7,524,908 B2
(45) Date of Patent: Apr. 28, 2009

(54) COPOLYMERIZED HIGH POLYMER FILM AND METHOD OF MANUFACTURING THE SAME

(75) Inventors: Jun Kawahara, Tokyo (JP); Keizo Kinoshita, Tokyo (JP); Nobutaka Kunimi, Ibaraki (JP); Akinori Nakano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/140,185

(22) Filed: May 27, 2005

(65) Prior Publication Data
US 2005/0282987 A1 Dec. 22, 2005

(30) Foreign Application Priority Data
May 28, 2004 (JP) ............................ 2004-159796

(51) Int. Cl.
*C08F 30/08* (2006.01)
(52) U.S. Cl. ................. 526/279; 526/285; 526/308; 526/335
(58) Field of Classification Search ............... 526/279, 526/285, 308, 335
See application file for complete search history.

(56) References Cited

U.S. PATENT DOCUMENTS

| 3,375,235 | A | * | 3/1968 | D'Alelio | .................. | 556/178 |
| 4,755,627 | A | * | 7/1988 | Colvin et al. | .................. | 585/440 |
| 5,252,676 | A | * | 10/1993 | Suyama et al. | .................. | 525/320 |
| 6,784,118 | B2 | * | 8/2004 | Hayashi et al. | .................. | 438/779 |
| 6,939,007 | B2 | * | 9/2005 | Zhao et al. | .................. | 351/233 |
| 2002/0009545 | A1 | * | 1/2002 | Hayashi et al. | .................. | 427/248.1 |
| 2003/0165625 | A1 | * | 9/2003 | So et al. | .................. | 427/385.5 |
| 2004/0063883 | A1 | * | 4/2004 | Hayashi et al. | .................. | 526/279 |
| 2004/0253442 | A1 | * | 12/2004 | Mubarekyan et al. | .. | 428/402.21 |

FOREIGN PATENT DOCUMENTS

| JP | 61-289530 | 12/1986 |
| JP | 10-139865 | 5/1998 |
| JP | 11-17006 | 1/1999 |
| JP | 2000-012532 | 1/2000 |
| JP | 2003-012776 | 1/2003 |
| JP | 2004-064023 | 2/2004 |
| JP | 2006-519292 | 8/2006 |

OTHER PUBLICATIONS

Stokich T.M. et al., "Real-Time FT-1R Studies of the Reaction Kinetics for the Polymerization of Divinyl Siloxane Bis-Benzocyclobutene Monomers", Material Research Symposium Proceeding, 227:103-114 (1991).
Japanese Patent Publication No. JP 61-289530 dated Dec. 19, 1986 English-language Abstract.
Japanese Patent Publication No. JP 2006-519292 dated Aug. 24, 2006 English-language Abstract.
Japanese Patent Publication No. JP 2004-064023 dated Feb. 26, 2004 English-language Abstract.
Japanese Patent Publication No. JP 10-139865 dated May 26, 1998 English-language Abstract.

* cited by examiner

*Primary Examiner*—Randy Gulakowski
*Assistant Examiner*—Michael M Bernshteyn
(74) *Attorney, Agent, or Firm*—Scully, Scott, Murphy & Presser, P.C.

(57) ABSTRACT

A copolymerized high polymer film includes plural organic polymers, as skeleton, and is manufactured by blowing more than two kinds of organic monomers of respectively specific structures, in a vapor phase condition, onto the surface of a heated substrate, through plasma being generated in a reaction chamber. As a result, manufacture of an organic high polymer film capable of further reducing the effective relative permittivity of organic polymer films as a whole can be achieved, and, at the same time, further improvement in mechanical strength of film as well as film forming speed can be achieved.

10 Claims, 6 Drawing Sheets

COPOLYMERIZED HIGH POLYMER FILM AND METHOD OF MANUFACTURING THE SAME

This application claims priority to prior Japanese patent application JP 2004-159796, the disclosure of which is incorporated herein by reference.

BACKGROUND OF THE INVENTION

1. Field of the Invention

The present invention relates to a method of manufacturing a copolymerized high polymer film capable of being used as an insulating film constituting semiconductor devices, a copolymerized high polymer film manufactured by such manufacturing method, and a semiconductor device using the copolymerized high polymer film. More specifically, the present invention relates to a method of obtaining vapor phase growth of copolymerized high polymer film through copolymerization on a surface, by using as raw materials more than two kinds of organic monomers having specific structures and supplying the same in vapor phase.

2. Description of the Related Art

Design rule of semiconductor integrated circuits continues to scale down, accordingly causing a gap between adjacent electrical wirings to come narrower. As a result, there arise more delays attributable to capacitance among electrical wirings, and hence there has been appearing an obvious deterioration of high speed performance in the operation of the integrated circuits due to such delays. Namely, in semiconductor integrated circuits, wiring signal delays are dependent on the wiring CR time constant (C: wiring capacitance; R: wiring resistance). In addition to an increase in wiring resistance due to a reduction in wiring width, the narrowed wiring gap causes an increase in the capacitance among the wirings.

When a wiring CR time constant in an electric circuit appreciably increases, it is concerned about a troublesome situation such that signal transmission speed on wiring may not sufficiently accord with the switching speed of transistors that constitute the circuit. Hitherto, aluminum alloy has been mainly used as a wiring material for semiconductor integrated circuits. In far miniaturized integrated circuits of great extent of integration, aiming at a faster operational speed and to avoid an increase in an electrical resistance of wirings due to the narrowed wiring width, it is necessary to lower electrical resistance of wiring material, and therefore employment of copper is currently preferred.

Meanwhile, in order to avoid an increase in capacitance at the gap among wirings, insulating film materials of lower degree of relative permittivity is now being adopted, rather than silica (SiO2) based insulating film that has been widely used till now. As an insulating film material of low relative permittivity, use of fluorine added silica (SiOF) or organic high polymer film (organic insulating film) as the abovementioned insulating film materials disposed between wirings of the semiconductor devices, comes into practice.

For example, fluorine added silica is already used in certain products on market For the purpose of enhancing the low permittivity of fluorine added silica materials, if fluorine concentration is increased, it causes a corrosion of wiring metal by hydrogen fluoride generated in reaction of fluorine with moisture or hydrogen. Otherwise, as a result of dissociation of fluorine, such a problem as increased relative permittivity will arise anew.

In addition, due to further progress of technology in semiconductor integrated circuits, demand for lower permittivity of wiring insulating film material is no longer satisfied sufficiently with the relative permittivity of around 3.3, now being available by fluorine added silica (SiOF). That is to say, attention is now focused on usage of an insulating material having such a very low relative permittivity as below 3.

On the other hand, an organic high polymer film, compared with the above mentioned silica-based materials, is lower in relative permittivity of the material itself and hence is advantageous when used as an insulating material of low permittivity. Further, with appropriate selection of the structure or type of organic chemical compound, or polymerization condition thereof, it will be possible to provide desired functions. Accordingly, organic high polymer films have been developed, which may be utilized as an interlayer insulating material of low permittivity, which is to insulate the gaps among multilayer wirings in semiconductor integrated circuits.

As a film-forming method adapted for functional organic high polymer films, there is Spin-Coating Method, in which raw material organic monomers are subjected to spin-coating and subsequently, are copolymerized within the coated layer resulting in forming of a high polymer film. The organic monomers per se mean raw material chemical compounds, which are to constitute an aimed organic high polymer (organic polymer) by polymerization reaction of such organic monomers as constituent units. The Spin-Coating Method is a method extensively used for film-forming of an organic high polymer film.

In this particular method, for the purpose of performing the spin-coating, organic monomers are dissolved in solvent, which is to be removed by evaporation in the film-forming process after the coated layer has been formed, and an inter-monomer polymerization reaction of the remaining organic monomers by heating are preceded. Finally, formed by polymerization reaction is a film of two-dimensional or tree-dimensional network structure or a high polymer film, which involves the organic monomers as constituent units. Composition and structure of the organic insulation film manufactured by the described Spin-Coating Method are determined by structures of organic monomers per se dissolved in the organic solvent used for the spin-coating as well as content ratio of plural kinds of the organic monomers.

For example, in "REAL-TIME FT-IR STUDIES OF THE REACTION KINETICS FOR THE POLYMERIZATION OF DIVINYL SILOXANE BIS BENZOCYCLO BUTENE MONOMERS" (Material Research Symposium Proceeding Vol. 227 p. 103, 1991) T. M. Stokich, Jr., W. M. Lee, R. A. Peters. (hereafter referred to as Non-Patent Document 1.), there is a description such that divinylsiloxane-bis-benzocyclobutene monomer is dissolved in solvent of mesitylene, and the resultant solution is applied to do the spin-coating, then is baked at 300° C.-350° C. for permitting a thermal ring-opening reaction of four-membered carbon ring of benzocyclobutene skeleton in the raw material monomer molecules to takes place, resulting in film-forming of an organic high polymer consisting of a three-dimensional molecular chain of divinylsiloxane bis-benzocyclobutene monomer being skeleton.

In the Spin-Coating Method, organic monomers are dissolved in an organic solvent and resultant solution is applied to spin-coating and accordingly, approximately 90% of such solution used in the spin-coating process is dispersed out of substrate. Therefore, with regard to organic monomers as starting materials, it is a method of low efficiency. Accordingly, cost percentage of organic monomers of starting materials against total production cost will become relatively high. Solvent is usually of volatile organic compounds, and is used in large quantities. Hence, a local exhausting facility is required to be installed at the site. In spin-coating or solvent removal process, it will be necessary to provide additional processes or facilities for control of environment, or for control or elimination of airborne fine dust particles or dispersed, dried and solidified fine particles of monomers, which will reflect upon production cost. In case that control of environment or elimination of fine particles is insufficient, it will be liable to deteriorate the characteristics or reliabilities of organic high polymer film thus formed.

Further, Japanese Unexamined Patent Publication (Kokai) No. 11(1999)-017006 (hereafter referred to as Patent Document 1.) describes a vapor-phase growth method of organic monomers as a film-forming method of functional organic high polymer film utilizing a vapor-phase growth method.

The described vapor-phase growth method of organic high polymer film vaporizes raw material organic monomers to feed monomer molecules in vapor phase and performs an inter-molecule thermal polymerization of the monomers on a substrate to obtain an organic high polymer film.

Such a film-forming method of organic high polymer film by, so-called, the organic monomer vaporization method, as described in the Patent Document 1, is different from the Spin-Coating Method, in that the organic monomer vaporization method does not utilize an organic solvent and also performs film-forming in a decompressed reaction chamber where oxygen does not exist in the atmosphere. Therefore, the organic monomer vaporization method has excelled in the sense that it is essentially free from a cause to deteriorate the quality of film, such as possible reaction with oxygen, or possible generation of foams or voids within the film attributable to a vaporization of organic solvent as may be observed in case of the Spin-Coating Method. Also, when substrate temperature is raised in an attempt to increase the degree of polymerization, or to increase the velocity of polymerizing reaction, organic monomer molecules once adsorbed, to the contrary, increases the velocity of desorption, hence, reducing the effective velocity of adsorption onto the substrate. Thus, technical difficulty still remains with the unresolved enhancement of growth rate yet to achieve.

Further, Japanese Unexamined Patent Publication (Kokai) No. 2003-012776 (hereafter to be referred to as Patent Document 2.) describes a film-forming method of copolymerized high polymer, which makes effective use of the principle of plasma polymerization. Namely, using a plurality of organic chemical compounds, and controlling the respective feeding ratios in a plurality of raw materials, a wide variety of copolymerized high polymer films can be formed with continuously differentiated microstructure of polymer in the direction of thickness to be formed.

This method excellently enables not only to achieve high adhesion properties with other semiconductor materials but also to further reduce relative permittivity of organic high polymers, as a whole, when organic polymer film is utilized as insulating film for low permittivity interlayer.

Furthermore, Japanese Unexamined Patent Publication (Kokai) No. 2000-012532 (hereafter referred to as Patent Document 3.) describes a plasma polymerization method as a film-forming method of functional organic high polymer film, which has further extended the development of vapor phase film-forming method of organic monomers as described in the Patent Document 1.

In the plasma polymerization method described in the Patent Document 3, organic monomer transported in vapor phase is excited to increase reactivity, when it passes through plasma, and reaches the substrate in an excited state to begin polymerization reaction over the substrate. Therefore, the film formed over the substrate is a film with structure of organic monomers in skeleton as the starting raw material, and the thickness of the formed film can be controlled at a high accuracy with a high reproducibility simply by controlling an amount of organic monomer to be supplied. However, the plasma polymerization method or the plasma copolymerization method described in the Patent Document 2 or 3, respectively, is useful as forming method of organic polymer film that can be utilized as a low permittivity interlayer insulating film, while there are not so many known organic chemical compounds that can be utilized as its raw materials. There are no more than several kinds of organic chemical compounds known as described in the Patent Document 2.

The properties required for a low relative permittivity interlayer insulating film are not only low relative permittivity but also a high thermal resistance, a high mechanical strength, a practical film forming speed, a high adhesion property with other semiconductor device materials and so forth. The demand for the properties of the low relative permittivity materials is as high as those for conventional materials of relatively high permittivity. To comply with such demand in film-forming of a low permittivity organic polymer film as described in the Patent Document 2 or Patent Document 3, it is necessary to provide a highly sophisticated technique in controlling the film quality as well as film structure. Nevertheless, with conventionally known organic monomers, there was an inevitable limitation in acquiring specifically low relative permittivity, while keeping a high film-forming speed and a high mechanical strength as stated in the above.

SUMMARY OF THE INVENTION

It is an object of the present invention to provide a method of manufacturing a copolymerized high polymer film, which is able to form a copolymerized high polymer film by copolymerization of more than two kinds of organic monomers to be used as skeleton therein, and is further able to reduce the relative permittivity of such polymer film.

It is another object of the present invention to provide a method of manufacturing a copolymerized high polymer film, which is able to improve the mechanical strength as well as the film-forming speed, by identifying the structure of organic monomers as skeleton.

It is still another object of the present invention is to provide a method of manufacturing a copolymerized high polymer film, by which manufacture of an organic high polymer film allowing further reduction in the effective relative permittivity of general organic high polymer films as a whole can be achieved.

According to one aspect of the present invention, there is provided a copolymerized high polymer film manufactured by a vapor phase growth method. The copolymerized high polymer film includes, as skeleton, a first organic monomer and a second organic monomer. The first organic monomer has plural isopropenyl groups, while the second organic monomer has an acetylene bond.

According to another aspect of the present invention, there is provided a method of manufacturing copolymerized high polymer film by a vapor phase growth process, in which the copolymerized high polymer film manufactured thereby is a copolymerized high polymer including a first organic monomer and a second organic monomer, as skeleton. The first organic monomer has plural isopropenyl groups, while the second organic monomer has an acetylene bond. The method includes the steps of:

supplying, as raw materials, a mixed gas containing vapor of the first and the second organic monomer molecules to a reaction chamber kept under a reduced pressure;

supplying said mixed gas onto a heated base substrate located in the reaction chamber, and permitting a polymerization reaction of said first and second organic monomer molecules blown over said heated base substrate to cause, thereby growing said copolymerized high polymer film.

a copolymerized high polymer film manufactured by a vapor phase growth method. The copolymerized high polymer film includes, as skeleton, a first organic monomer and a second organic monomer, with the first organic monomer having plural isopropenyl groups and the second organic monomer having an acetylene bond.

DESCRIPTION OF THE PREFERRED EMBODIMENTS

Before explaining examples of the present invention, in order to facilitate understanding of the present invention, description will be made hereinbelow as regards a manufacturing method of organic high polymer film by the conventional technology, with reference to FIG. 1.

Figure 1:
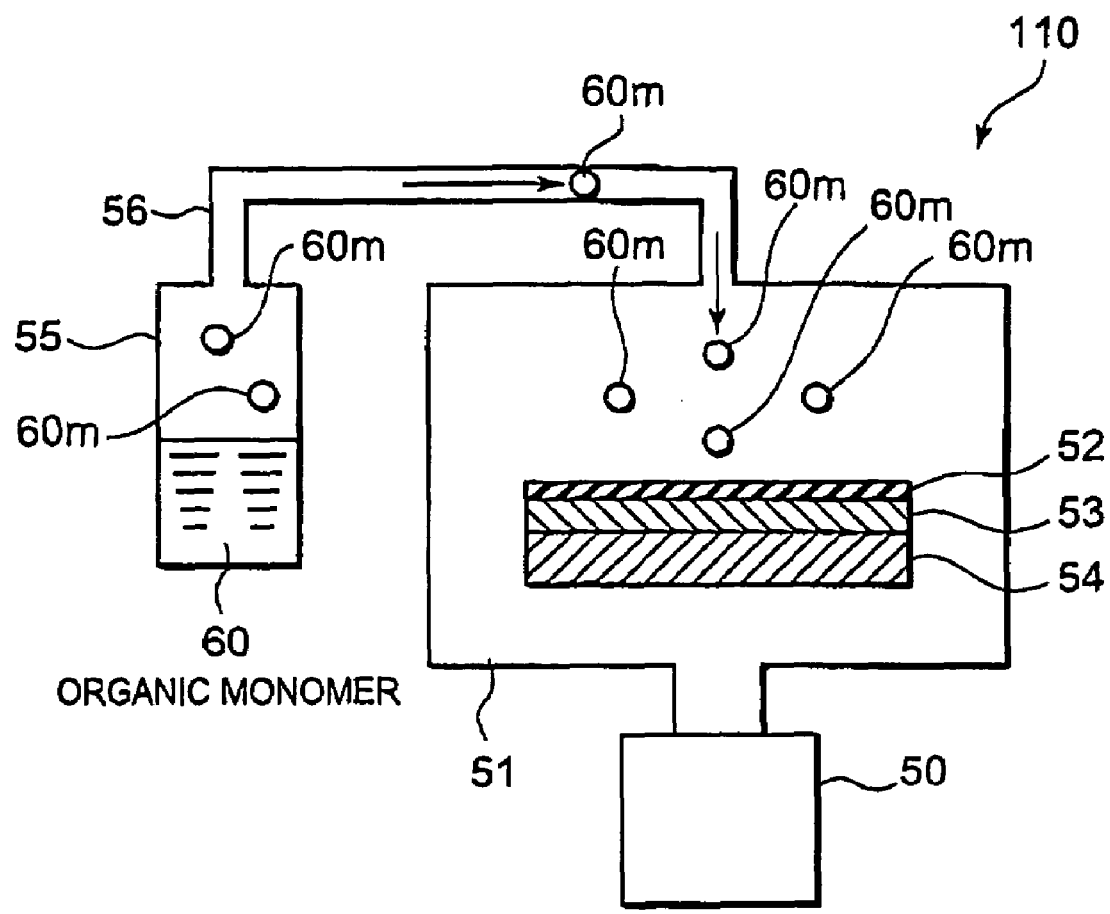
FIG. 1 is a diagrammatic view illustrating the principle of MVP method, which is utilized in a manufacturing method of copolymerized high polymer film as disclosed in the Patent Document 1.

Referring to FIG. 1, a film-forming apparatus is, as indicated in Patent Document 1, one operating based on a vapor phase growth method of an organic high polymer film, which utilizes a directly vaporized vapor of organic monomer raw material. An organic monomer 60 in a tank 55 is heated to vaporize under a reduced pressure. On the other hand, a reaction chamber 51 is kept under a reduced pressure by an exhaust pump 50 and vaporized organic monomer molecules 60 m are sent to reaction chamber 51 through a vaporized organic material piping 56. The supplied organic monomer molecules 60 m are adsorbed on the surface of a semiconductor substrate 53, on which semiconductor integrated circuits have been previously formed. In that case, the semiconductor substrate 53 is heated by a substrate heating module 54, and at that temperature, polymerization reaction proceeds among the organic monomer molecules 60 m mutually resulting in formation of a cross-linked structure of an organic insulating film 52.

Now, description of the present invention will be made in more detail.

The inventors of the present patent application have found that when an organic high polymer film is manufactured by vapor phase growth method, or, for example, by effective use of the principle of the above-stated plasma polymerization method, the following copolymerized high polymer film can be obtained. The copolymerized high polymer film consists of a skeleton of more than two kinds of specifically structured organic monomers. The monomers thereof respectively have unsaturated bonds of being reactive groups. At least one kind of the monomers, which will be referred to as first organic monomers, have a single kind of or plural isopropenyl group (s). At least another kind of monomers, which will be referred to as second organic monomers, have an acetylene bond. By the use of such organic monomers in plurality, copolymerized high polymer film can be made by copolymerization of the plural organic monomers. In addition, it was further found that a reduction in the relative permittivity is enabled according to the ratio of monomer having acetylene bond. Further, by specifying the structure of the organic monomers, or more specifically, by using at least one kind of monomer, i.e., first organic monomers, having plural isopropenyl groups and at least another kind of monomer, i.e., second organic monomers, having an acetylene bond, it was found that an increase in the mechanical strength of the film and also improvement of the film-forming speed can be accomplished.

In addition to such findings, the inventors have successfully confirmed that manufacturing of the organic high polymer film capable of further reducing the effective relative permittivity of general organic high polymer films as a whole, can also accord with a high reproducibility, maneuverability and wider range of utilization, and as a result, a completion of the present invention can be reached.

The copolymerized high polymer film according to the present invention is a copolymerized high polymer film made by vapor phase growth method. The copolymerized high polymer film is made with the configuration of at least two kinds of organic monomers including the first and the second organic monomers as skeleton. The first organic monomers have at least one or plural isopropenyl group(s). The second organic monomers have an acetylene bond.

Also, the copolymerized high polymer film according to the present invention is a copolymerized high polymer film made by vapor phase growth method. The copolymerized high polymer film is made with the configuration of at least three kinds of organic monomers including the first, the second, and the third organic monomers, as skeleton. The first, the second, and the third organic monomers respectively have unsaturated bonds of being reactive groups. At least one kind of those monomers, i.e., the first organic monomers have plural isopropenyl groups. At least another kind of monomers, i.e., the second organic monomers, have an acetylene bond.

In this case, among the organic monomers, it is preferable that the first organic monomer having isopropenyl group may be diisopropenyl benzene monomer. The diisopropenyl benzene monomer has a first polymerization reactive site consisting of isopropenyl group and is indicated as Formula I of Chemical Formula 1 as set forth below.

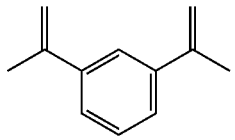

(I)

DIISOPROPENYLBENZENE

Also, among the organic monomers, it is preferable that the second organic monomer having acetylene group may be acetylene gas, which has a second polymerization reactive site consisting of acetylene bond and is indicated as Formula (II) of the Chemical 2 Formula as set forth below.

[Chemical 2]

 H—C≡C—H ACETYLENE (II)

Also, among the organic monomers, it is preferable that the first organic monomer having isopropenyl group may be diisopropenyl benzene monomer, which has a first polymerization reactive site consisting of isopropenyl group, and is indicated as Formula (I) of the above-mentioned Chemical 1 Formula. Among the organic monomers, it is preferable that the second organic monomer having an acetylene group is preferably acetylene gas, which has a second polymerization reactive site consisting of acetylene bond, and is indicated as Formula (II) of the above-mentioned Chemical 2 Formula.

Also, among the organic monomers, it is preferable that the third organic monomer has no polymerization reactive site. The polymerization reactive site consists of isopropenyl group or acetylene bond. The third organic monomer may be able to cause polymerization reaction among such molecules alone.

Also, among the organic monomers, it is preferable that the third organic monomer has no polymerization reactive site consisting of isopropenyl group or acetylene bond. The third organic monomer may be provided with a cyclic ring structure, which is capable of effecting ring-opening, and an ethene-1,2-diyl(—CH=CH—) structure, which is capable of effecting addition polymerization, within the molecule.

Also, in the present invention, among the organic monomers, it is preferable that the third organic monomer has no polymerization reactive site consisting of isopropenyl group or acetylene bond. The third organic monomer may contain silicon atoms within the molecules. At least one of the first and the second organic monomers may contain no silicon atom within the molecules.

Also, among the organic monomers, it is preferable that the third organic monomer has no polymerization reactive site consisting of isopropenyl group or acetylene bond. The third organic monomer may contain a siloxane bond within the molecules.

Also, among the organic monomers, it is preferable that the third organic monomer has no polymerization reactive site consisting of isopropenyl group or acetylene bond. The third organic monomer may be divinylsiloxane-bis-benzocyclobutene monomer, which has a polymerization reactive site consisting of acetylene bond and is indicated as Formula (III) of Chemical 3 Formula as set forth below.

[Chemical 3]

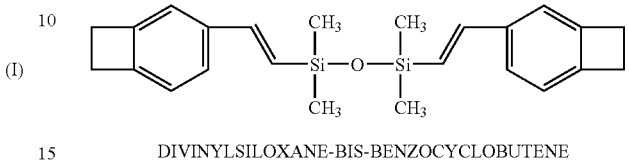

(III)

DIVINYLSILOXANE-BIS-BENZOCYCLOBUTENE

Also, in the method of manufacturing a copolymerized high polymer film by vapor phase growth method according to an aspect of the present invention, the copolymerized high polymer film comprises copolymerized high polymer with a configuration of at least two or more kinds of organic monomers including the first and the second organic monomers as skeleton, of which the first organic monomer has plural isopropenyl groups and the second organic monomer has an acetylene bond. The method thereof comprises at least an operational step of supplying a mixed gas including at least two or more kinds of the organic monomers including the first and the second organic monomers, as raw materials to a reaction chamber under a reduced pressure, and an operational step of supplying the mixed gas onto a heated base substrate installed within the reaction chamber and an operational step in which the first and the second organic monomers contained in the mixed gas blown over the heated base substrate cause to perform copolymerization reaction resulting in the growth of copolymerized high polymer film.

Also, in the method of manufacturing a copolymerized high polymer film by vapor phase growth method according to another aspect of the present invention, the copolymerized high polymer film comprises a copolymerized high polymer with a configuration of at least three or more kinds of organic polymers including the first, the second, and the third organic monomers as skeleton, the organic monomers respectively having a reactive unsaturated bond and the first organic monomer among them having plural isopropenyl groups, and the second organic monomer having an acetylene bond. The method thereof comprises at least an operational step of supplying a mixed gas including vapor of at least three or more kinds of the organic monomers including the first, the second, and the third organic monomers as raw materials to a reaction chamber under a reduced pressure, another operational step of supplying the mixed gas onto the heated base substrate installed in the reaction chamber, and a further operational step in which at least three or more kinds of organic monomers including the first, the second, and the third organic monomers contained in the mixed gas blown over the heated base substrate cause to perform polymerization reaction resulting in the growth of copolymerized high polymer film.

Also, between the operational step of supplying the mixed gas to the reaction chamber under a reduced pressure and the operational step of blowing the same gas over the heated base substrate, it is preferable that an operational step may be provided for permitting the mixed gas to pass through plasma generated in the reaction chamber under a reduced pressure.

Further, among the organic monomers to be utilized as raw materials, it is preferable that the first organic monomer having isopropenyl group may be diisopropenyl benzene monomer. The diisopropenyl benzene monomer has a first polymerization reactive site consisting of isopropenyl group, and is indicated as Formula (I) of Chemical 4 Formula as set forth below

[Chemical 4]

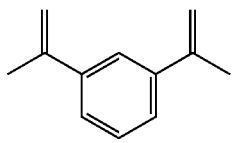

DIISOPROPENYLBENZENE (I)

Furthermore, among the organic monomers to be utilized as raw materials, it is preferable that the second organic monomer having acetylene group may be acetylene gas, which contains a polymerization reactive site consisting of acetylene bond, and is indicated as Formula (II) of Chemical 5 Formula as set forth below.

[Chemical 5]

 ACETYLENE (II)

Also, among the organic monomers to be utilized as raw materials, it is preferable that the first organic monomer having isopropenyl group may be diisopropenyl benzene monomer, which contains a first polymerization reactive site consisting of isopropenyl group, and is indicated as Formula (I) of the above-mentioned Chemical 4 Formula. Among the organic monomers, it is preferable that the second organic monomer having acetylene group may be acetylene gas, which contains a second polymerization reactive site consisting of acetylene bond, and is indicated as Formula (II) of the above-mentioned Chemical 5 Formula.

Also, among the organic monomers to utilize as raw materials, it is preferable that al least one kind of monomer, i.e., the third organic monomer, having neither polymerization reactive site consisting of isopropenyl group nor polymerization reactive site consisting of acetylene bond may be of a type that is capable of effecting polymerization reaction by its molecules alone.

Further, among the organic monomers to be utilized as raw materials, it is preferable that the third organic monomer has no polymerization reactive site consisting of isopropenyl group or acetylene bond. The third organic monomer may contain a cyclic ring structure, which is capable of effecting ring-opening, and ethene-1,2-diyl(—CH═CH—) structure, which is capable of effecting addition polymerization, within its molecules.

Still further, among the organic monomers to be utilized as raw materials, it is preferable that the third organic monomer has no polymerization reactive site consisting of isopropenyl group or acetylene bond. The third organic monomer may contain silicon atoms within its molecules while at least one of the first and second organic monomers may contain no silicon atom, Furthermore, among the organic monomers to be utilized as raw materials, it is preferable that the third organic monomer has no polymerization reactive site consisting of isopropenyl group or acetylene bond. The third organic monomer may contain siloxane bond within its molecule.

Also, among the organic monomers to be utilized as raw materials, it is preferable that the third organic monomer has no polymerization reactive part consisting of isopropenyl group or an acetylene bond. The third organic monomer may be a divinylsiloxane-bis-benzocylobutene monomer. The divinylsiloxane-bis-benzocylobutene monomer has two kinds of polymerization reactive sites comprising vinyl group and cyclobutene group and is indicated as Formula (III) of Chemical 6 Formula as set forth below.

[Chemical 6]

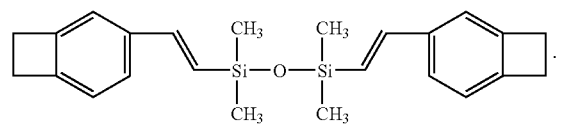

DIVINYLSILOXANE-BIS-BENZOCYCLOBUTENE

According to the above-described methods of manufacturing copolymerized high polymer films in accordance with the present invention, for example, in case of manufacturing in utilization of the principle of plasma polymerization method, more than two kinds of organic monomers used as skeleton, of which at least one kind of monomer, i.e., the first organic monomer, has plural isopropenyl group and at least another monomer, i.e., the second organic monomer, has acetylene bond, such plural organic monomers can effect copolymerizing to form a copolymerized high polymer film. Further, relative permittivity can be reduced according to the ratio of organic monomer having acetylene bond. Moreover, by specifying the structure of such organic monomers, or further specifically, by using at least one kind of plural isopropenyl groups and at least another kind of monomer having acetylene bond, it is able to improve mechanical strength of film and also to increase film manufacturing speed. In addition to acquirement of these kinds of various findings, manufacture of organic films capable of further reducing effective relative permittivity of general organic high polymer films as a whole can have been achieved.

A detailed description of the present invention will now be furthermore made below.

In one aspect of the present invention, when an organic high polymer insulating film, usable as organic insulating film, is manufactured utilizing, for example, the above plasma polymerization method, the organic high polymer insulating film can be formed by copolymerization of plural organic polymers by the use of as raw materials more than two kinds of organic monomers including the first and the second organic monomers, as skeleton for copolymerized high polymer, at least one kind of the monomer, i.e., the first organic monomer, having plural isopropenyl groups and at least another kind of monomer, i.e., the second organic monomer, having an acetylene bond. In addition, according to the ratio of organic monomer having acetylene bond, it has become possible to reduce relative permittivity.

Otherwise, in another aspect of the present invention, when organic high polymer insulating film is made, for example, utilizing the plasma polymerization method, a copolymerized high polymer film can be made by copolymerization of plural organic monomers. The plural organic monomers used as raw materials may comprise copolymerized high polymers with configuration of more than three kinds of organic monomers including the first, the second, and the third organic monomers, as skeleton. The first, the second, the third organic monomers respectively have unsaturated bonds of reactive sites, of which the first organic monomer has an isopropenyl group, and also the second organic monomer has an acetylene bond. The rest of monomers, i.e., the third organic monomer, has neither of those are capable of causing polymerization reaction within their molecules alone. Further, it has become possible to reduce relative permittivity according to the ratio of organic monomer having an acetylene bond.

Furthermore, according to a further aspect of the present invention, by specifying the structure of such organic monomers, more specifically, by employing organic monomers in which the first organic monomer has plural isopropenyl groups, and the second organic monomer has an acetylene bond, it is able to improve not only mechanical strength of film but also film forming speed. In addition to such findings, it is enabled to further reduce the effective relative permittivity of organic high polymer films as a whole.

Also, in the present invention, in case of using more than three kinds of organic monomers including the first, the second and the third organic monomers, while those monomers respectively have unsaturated bonds of being reactive sites, at least one kind among them, i.e., the third organic monomer, is capable of causing polymerization reaction by itself alone. Hence it is enabled to increase mechanical strength of film in copolymerization with a monomer having plural isopropenyl groups.

For example, in plasma copolymerization of diisoprpenyl benzene and divinylsiloxane benzocyclobutene, an increase in an amount of supply of diisopropenyl benzene can increase Young's modulus of elasticity of the film made by the plasma copolymerization.

On the other hand, in this case, relative permittivity remains approximately unchanged. Further, though more than three kinds of organic monomers to be used have respectively unsaturated bonds of being reactive sites, at least one thereof, i.e., the third organic monomer, is capable of causing copolymerization reaction by the monomer alone. Hence, it is possible to increase the film forming speed in copolymerization with monomers having acetylene groups. In such a case, relative permittivity remains approximately unchanged. To this effect, in the case of simultaneous supply of the three kinds of organic monomers, it is possible not only to hold the characteristics of plasma-copolymerized film obtained by the simultaneous supply of the two kinds of monomers undamaged but also to realize a reduction in the relative permittivity, which could not be accomplished if each of such organic monomers is individually supplied alone. Therefore, the plasma-copolymerized film made by simultaneous supply of more than three kinds of organic monomers containing those can acquire a high mechanical strength, a high film-forming speed and low permittivity, as required.

In the next place, an example of the growth apparatus to be utilized in case of practicing the method according to the present invention will be described with reference to FIG. 2 which schematically shows outlines thereof.

Shown below is the case where the three kinds of organic monomers are used. However, in the case where the two kinds of the organic monomers are used, similar operation and effects are achieved except that organic polymer C is excluded.

Figure 2:
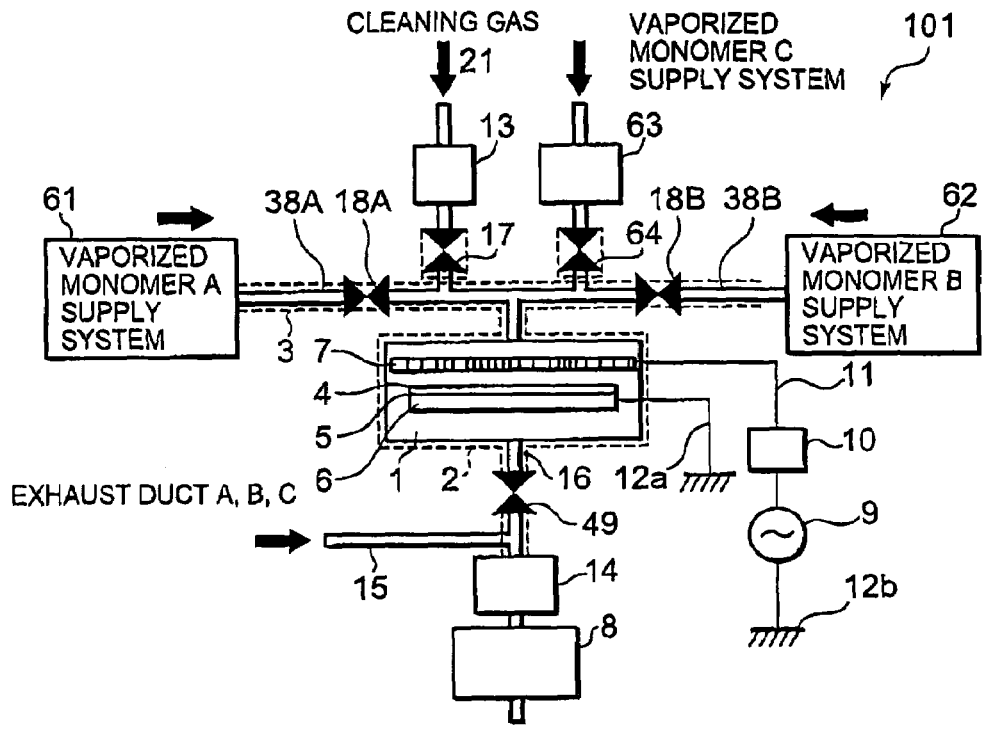
FIG. 2 is a diagrammatic view schematically illustrating an example of the configuration of high polymer film forming apparatus capable of being utilized in practicing the manufacturing method of copolymerized high polymer film according to the present invention.

As shown in FIG. 2, a reaction chamber 1 is kept under a reduced pressure by a vacuum Pump 8. Within the reaction chamber 1, the substrate heater 6 is provided. A semiconductor substrate 5 is fixed on a substrate heater 6, as a base over which copolymerized high polymer film will be formed. Raw materials—an organic monomer A, an organic monomer B and an organic monomer C—(hereafter referred to as an organic monomer A, B, C) are vaporized respectively in a vaporizing supply system 61, 62 and 63, and the vapors are supplied with their carrier-gas to the reaction chamber 1 via vaporized raw material supply pipes 38A, 38B and 38C, and valves 18A, 18B and 18C.

Until reaching the reaction chamber 1, a tube wall for the vaporized raw material supply pipes 38A, 38B and 38C is heated by a heater 3 provided there and kept at a temperature so that partial pressures of the organic monomer A, B, C are always lower than respective equilibrium vapor pressures at the temperature of the pipe wall. Vapors of the organic polymer A, B, C respectively sent with carrier gas are supplied to the shower head 7, blended and blown onto the surface of the substrate 5.

Meanwhile, between the shower head 7 and the substrate heater 6, RF electric power is impressed from an RF power source 9 so as to induce plasma. Therefore, molecules of the organic polymer A, B, C are excited, while passing through the plasma-generated space, and reach the surface of substrate in an activated state. Thereafter, the molecules are adsorbed to the surface of the substrate 5, which is heated by the substrate heater 6, and previously activated molecules of organic monomer A, B, C with further reception of thermal energy promptly start copolymerization reaction, hence copolymerized high polymer film 4 grows on the surface of the semiconductor substrate 5.

Further, a part of molecules of the activated organic monomer A, B, C tends to dissociate again after deposition on the substrate surface. Probability of the re-desorption goes higher, if excited by thermal stimulus only. When plural kinds of monomers are used, desorption probability of each monomer is different each other so that control of content ratio of the monomers contained in the copolymerized high polymer is not easy. In "plasma Copolymerization Method", previously the activated molecules of the organic polymers A, B, C are adsorbed much faster, so that copolymerization reaction takes place promptly. From this aspect, it is preferable to apply "Plasma Polymerization Method".

Further, actually a part of the monomers polymerizes in plasma, and some of them adsorb on the surface of the substrate as dimers and trimers. In this case, under a high degree of vacuum where average free path is large enough, the organic monomer A, B, C intermix uniformly and hence, a uniform product of the copolymerized high polymer insulating film can be acquired. In particular, in case of using plural kinds of monomers with quite different equilibrium vapor pressures (saturated vapor pressures), if partial copolymerization to form dimmer or trimer is encouraged to take place in plasma, difference of equilibrium vapor pressure (saturated vapor pressure) of each monomer as much as three-digit level does not cause any material problem from the viewpoint of practical usage. From this standpoint, it is rather preferable to apply "Plasma Polymerization Method".

Also, while plural kinds of organic monomers are blown as a mixed gas over the surface of the substrate 5, in that case, it is necessary to keep the ratio of plural kinds of organic monomers blown over the substrate equal at any point throughout the surface of the substrate 5. That uniform mixing can be made in the reaction chamber 1 or by mixing at the shower head 7 provided in the reaction chamber 1, and also it can be mixed on the way of flow path and be introduced in the reaction chamber 1 after being uniformly mixed. Unit or a method for effecting the prior mixing on the way of flow path may comprised of, besides the merging of the piped paths as shown in FIG. 2, installing of an appropriate mixing chamber so as to achieve the full mixing while gases are held therein.

Also, unreacted raw material monomers at the reaction chamber 1 are decompressed by the vacuum pump 8, and its wall face being thermally insulated likewise as the vaporized raw material supply piping 38A, 38B, 38C, without deposition or coagulation on the wall surface, goes, in gaseous state, to a cold trap 14 via an exhaust tube 16, which is heated by heater. In the cold trap 14, gaseous raw material monomers A, B, C coagulate on the inner surface of trap for recovery/ removal, and carrier gas after depletion of raw material monomer as well as other gas used for plasma generation are sent to the exhaust gas pump 8. The cold trap 14 is not necessarily equipped with cooling system, because when saturation vapor pressure of the monomer to be used is low, it will liquefy or solidify well at room temperature. To the contrary, if saturation vapor pressure is relatively high, it passes through an exhaust pump in gaseous state, and will be treated at disposal treatment facility to become harmless.

In case that the organic monomer to be used in the present invention is in liquid state, such a liquid-state organic monomer is to be vaporized by a vaporization supply system as described below. Assuming the organic monomer A being in a liquid state, the explanation will be made hereinbelow.

Figure 3:
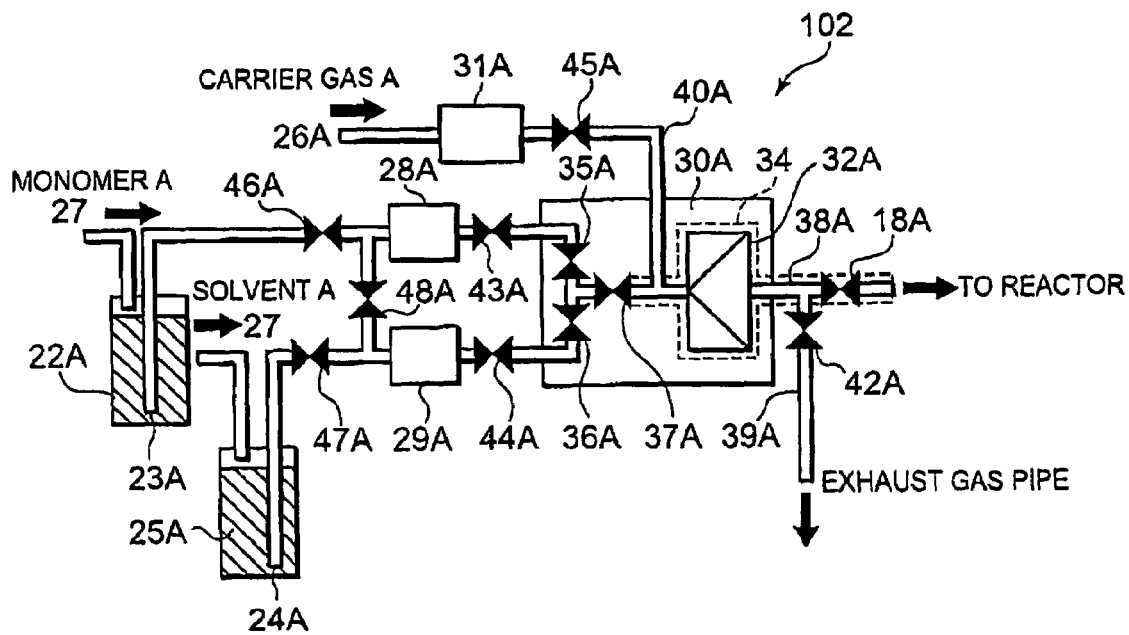
FIG. 3 is a diagrammatic view schematically illustrating an example of the configuration of vaporization control apparatus capable of being utilized in vaporized supply of liquid state organic monomer to be utilized for the manufacturing method of copolymerized high polymer film according to the present invention.

FIG. 3 shows the process that the polymer A starting from a tank 23A is vaporized at vaporization control apparatus and supplied up to a point immediately before reaction chamber. Explained hereunder is the case of an organic monomer but similar principle can apply to the case of a dimer, namely organic oligomer. The organic monomer A (22A) is supplied via a valve 46A, a fluid flow rate indicator A (28A) and a valve 43A, to a vaporization control apparatus A (30A). Further, from the fluid flow rate indicator A (28A), it is supplied, via a feedback-controlled vaporization volume control valve A (35A) and a valve 37A in the vaporization control apparatus A, to the vaporization chamber (32A). Meanwhile, a carrier gas A (26A) is supplied, via a valve 45A, to the vaporization control apparatus A. Accordingly, the raw material monomer A (22A) and the carrier gas A (26A) are merged at just before the vaporization chamber A (32A). The liquid state raw material A (22A) being supplied to the vaporization chamber A (32A) in a state of mixture with the carrier gas A is heated with thermal energy from a heater 34A and, also with the vaporization chamber 32A being decompressed, is to be continuously vaporized. Namely, a thermal energy to be consumed as vaporization energy and quenching effect by quick pressure-reduction and volume-expansion of carrier gas is compensated for with a thermal energy generated by heating at the heater 34A. Therefore, the vaporized raw material monomer A, being in a state of elevated gas temperature, is supplied, via a vaporized raw material supply tube 38A, thermally insulated by the heater 3 and a valve 18A, to the reaction chamber 1.

In case that organic monomer to be used in the present invention is in solid state, the organic monomer is to be vaporized by a vaporization supply system as explained below. Assuming the organic monomer B being in a solid state, the explanation will be made hereunder.

Figure 4:
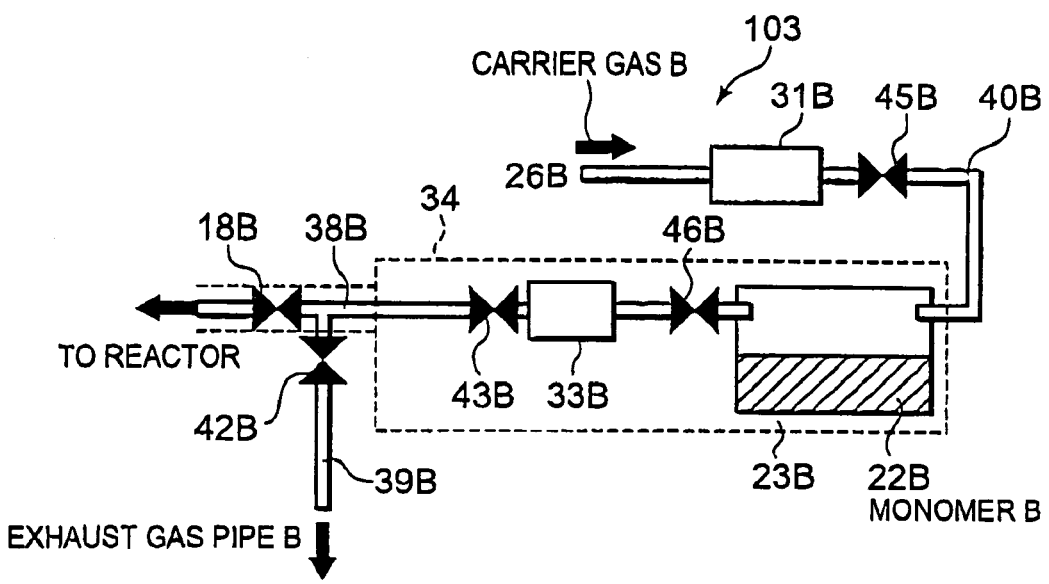
FIG. 4 is a diagrammatic view schematically illustrating an example of the configuration of vaporization control apparatus capable of being utilized in vaporized supply of solid state organic monomer to be utilized for the manufacturing method of copolymerized high polymer film according to the present invention.

FIG. 4 shows the process that the organic monomer B starting at the tank 23B, where the carrier gas 26B is being fed, is sent up to a point of the vaporized raw material supply tube 38B, which is utilized for further supplying to the reaction chamber 1.

Explained hereunder is the case of a monomeric organic monomer. Similar principle can apply to the case of a dimmer of oligomer. The carrier gas B (26B), its flow rate being controlled at the gas flow rate control apparatus 31B, is supplied, via the valve 45B, to the organic monomer B tank 23B. The organic monomer B tank 23B is heated to a designated temperature. Designation of the temperature thereof is selected so that the organic monomer B vaporized from a molten state or sublimed from a solid state may keep an adequate saturation vapor pressure. Vapor of the monomer B as vaporized is mixed with the carrier gas B and supplied, via the valve 46B, the gas flow rate indicator B (33B) and the valve 43B, to the vaporized raw material supply tube 38B, then further to the reaction chamber 1 via the valve 18B. In such a case, within the organic monomer B tank 23B, partial pressure of the organic monomer B gas molecules contained in the carrier gas B is practically equal to the equilibrium vapor pressure (saturated vapor pressure) at that temperature, and supply amount of the organic monomer B per unit time is determined by flow rate of the carrier gas B.

As stated above, the organic monomer to be used for raw material can be supplied to the reaction chamber in a gaseous phase, by choosing an appropriate vaporizing supply system promptly changing the supply amount to meet with the aim, regardless whether the organic monomer is in liquid phase or in solid phase at room temperature. If the organic monomer is already in a gaseous phase at room temperature, the same supply system as the case of an ordinary gaseous raw material gas can be taken. In the present invention, the carrier gas used for supply of the organic monomer may be an appropriate gas inert to the organic monomer, such as helium gas, argon gas or neon gas.

In the manufacturing method of copolymerized high polymer film according to the present invention, the organic monomer having Isopropenyl group is preferably to have plural isopropenyl groups. Also, the organic monomer, having no isopropenyl group or acetylene bond, is preferably to have plural unsaturated bonds capable of being reactive sites. Further, the organic monomer having both of isopropenyl group and acetylene bond can also be used as a raw material. However, in such a case, it is also preferable to use separately an organic monomer having either isopropenyl group or acetylene bond.

Hereunder, a description of a typical example of the present invention will be provided. While the described example is a preferred one of the present invention, it should be understood that the present invention is not exclusively limited to this example.

EXAMPLE

As the organic monomer A using diisopropenyl benzene of Formula (I), stated above, as the organic polymer B using acetylene of Formula (II), stated above and as the organic monomer C using divinylsiloxane benzocyclobutene (DVS-BCB) of Formula (III), stated above, a series of the processes from the vaporized mixed gases to manufacturing of copolymerized high polymer films from diisopropenyl benzene, acetylene and DVS-BCB will be explained in detail hereunder, with the case of copolymerized high polymer film growing method taken as example shown in FIG. 2, together with the supply system shown in FIG. 3. In the following explanation, symbol A in FIG. 3 is omitted for the brevity sake.

At initial condition of the vaporization control apparatus of copolymerized high polymer film manufacturing facilities, a valve 18 and a valve 49 are set for "open", the reaction Chamber 1, the exhaust pipe or tube 16, a waste liquid pipe 15, a vaporizing chamber 32 and a vaporized raw material supply pipe 38 are vacuumed by the vacuum pump a for exhaustion.

Vaporization temperature is preferably an appropriate temperature necessary to secure the volume of supply demand, and should be a temperature not to cause a denaturing such as decomposition or polymerization of organic polymer itself, or a clogging of pipes attributable to the temperature. Also, material of pipes, such as the vaporized raw material supply pipe 38, which is heated by the heater 3, should withstand such temperatures. Otherwise, heating temperatures must be designated to meet heat resistant range of the pipe materials to be heated. Also, temperature of pipes being heated should be monitored with thermocouples located at various points of pipes so as to constantly maintain designated temperature of the heated pipes by controlling heat output of the pipe heater.

The valve 45 of vaporizing supply system shown in FIG. 3 is set for "open", and a carrier gas (He) 26 is supplied from carrier gas supply pipe 40, via the gas flow controller 31, to the gas controller 30, and further is led to the vaporized raw material supply pipe 38 to be exhausted out of facilities via the exhaust pipe 16 by the vacuum pump 8.

In the vaporizing process for DVS-BCB monomer, vaporizing temperature is set at 210° C. Flow rate of He Carrier Gas is set for 400 sccm. Under this condition, total pressure P of vaporization controller is 7 Torr, and internal pressure of reaction chamber 1 is 2 Torr. A silicon substrate (the semiconductor Substrate) 5 mounted with semiconductor integrated circuit is heated to 400° C. by the substrate heater 6 installed in the reaction chamber 1. Also, when DVS-BCB, diisopropenyl benzene and acetylene are used, heating temperature of the substrate at the time of film forming is appropriately selected between 200° C. and 450° C.

DVS-BCB and diisopropenyl benzene are, together with He carrier gas respectively, supplied to reaction chamber 1 via respective vaporized raw material supply pipes 38A and 8B, and mixed. Acetylene is supplied in a single component, via the raw material supply pipe 38C, to the reaction chamber 1 and is mixed with the above stated two kinds of vaporized raw materials. At the shower head 7 in the reaction chamber 1, gas mixture including the above-stated three kinds of raw materials is dispersed and blown over the surface of the substrate 5.

The shower head 6 is applied with RF electric power having frequency of 13.56 MHz against the surface of a grounded substrate heater. Thus plasma of He used as carrier gas is generated under the shower head 7.

In that case, RF electric power needs to be controlled so as to limit the plasma energy to no more than activating unsaturated bonds of reactive parts existing in molecules of the above-stated three kinds of raw materials. The mixed gas of the above-stated three kinds of raw materials is activated while being blown over the semiconductor substrate 5 through He plasma. Over the surface of the substrate heated to 400° C., the above-stated activated raw materials are copolymerized to form a copolymerized high polymer film (organic insulating film) with configuration of DVS-BCB, diisopropenyl benzene and acetylene as skeleton. In such a case, while carrier gas containing unreacted raw materials reaches the exhaust pipe 16, DVS-BCB and diisopropenyl benzene contained therein are liquefied again at the cooling trap 14 located at a place prior to exhaust pump and are not entrained into exhaust pump 8. Supplying the three kinds of raw materials until the aggregate supplies reach a designated amount, the film forming continues and then, respective supplies are stopped and the semiconductor substrate 5 in the reactor chamber 1 is taken out of the chamber 1.

In this example, all of the carrier gas 26, a purge gas and a pressure delivery gas 27 are helium (He). A cleaning gas 21 used for cleaning of the interior of reaction chamber is $NF_3$, or blend gas of $SF_6$ and oxygen or ozone. Also, blend gas of fluorocarbon gas, such as $CF_4$ or $C_2F_6$ plus oxygen or ozone can be equally used.

Thus, in the manufacturing method of copolymerized high polymer film according to the present invention, for example, in case of using the principle of plasma polymerization method, use of more than two kinds of organic monomers as skeleton, respectively having unsaturated bonds as reactive sites, at least one kind of those monomers, i.e., the first organic monomer, having plural isopropenyl groups, and at least another kind of monomer, i.e., the second organic monomer, having an acetylene bond, and such plural kinds of organic monomers copolymerized enables it to form a copolymerized high polymer film. In addition, according to the ratio of organic monomer having an acetylene bond, a reduction in the relative permittivity can be achieved. Also, by specifying structure of such organic monomers, more specifically, the first organic monomer having plural isopropenyl groups, and the second organic monomer having an acetylene bond, using such organic monomers enables it to improve mechanical strength of the film and to improve film forming speed. In addition to these effective results by the invention, it has been enabled to manufacture an organic high polymer film capable of further reducing the effective relative permittivity of general organic high polymer insulating film as a whole.

Now, specific and concrete effects of the present invention will be explained hereunder, with reference the accompanying drawings.

First, explained below are characteristics of relative permittivity of organic high polymer insulating film made by plasma copolymerization of three kinds of organic monomers as described in Example 1 of the present invention.

Figure 5:
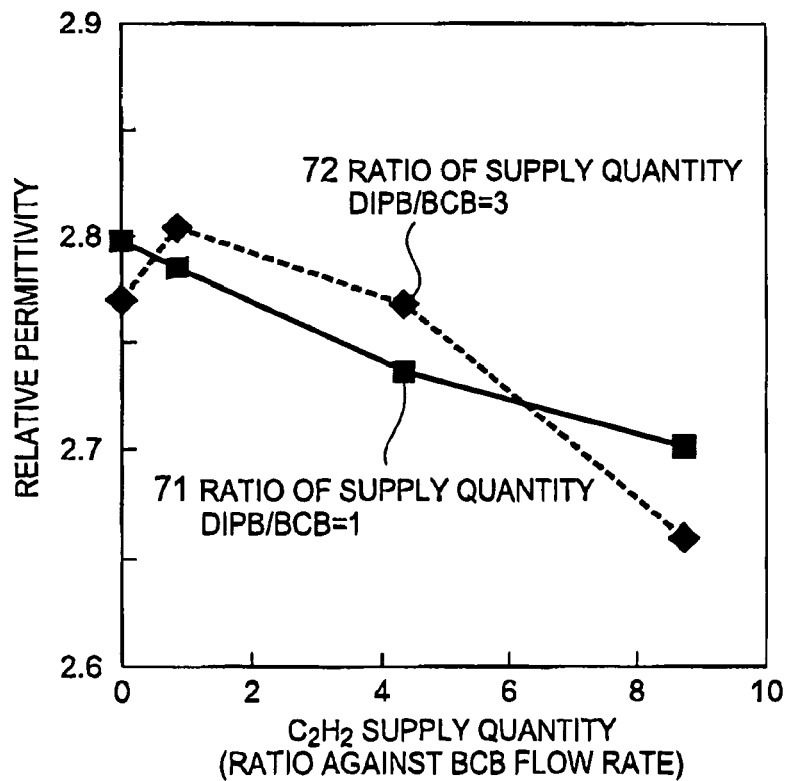
FIG. 5 is an explanatory view illustrating the effect of relative permittivity of Example-1 according to the present invention.

FIG. 5 shows variation of relative permittivity when an amount of supply of acetylene ($C_2H_2$) varies, where acetylene supply amount is indicated in the ratio to supply amount of DVS-BCB (hereafter coded in drawings as BCB) being 1. Also, FIG. 5 shows, in a solid line 71, the case that ratio of supply amounts of DVS-BCB versus diisopropenyl benzene (hereafter coded as DIPB) is 1, and, in a dashed line 72, the case that the ratio of supply amounts is 3.

Figure 6:
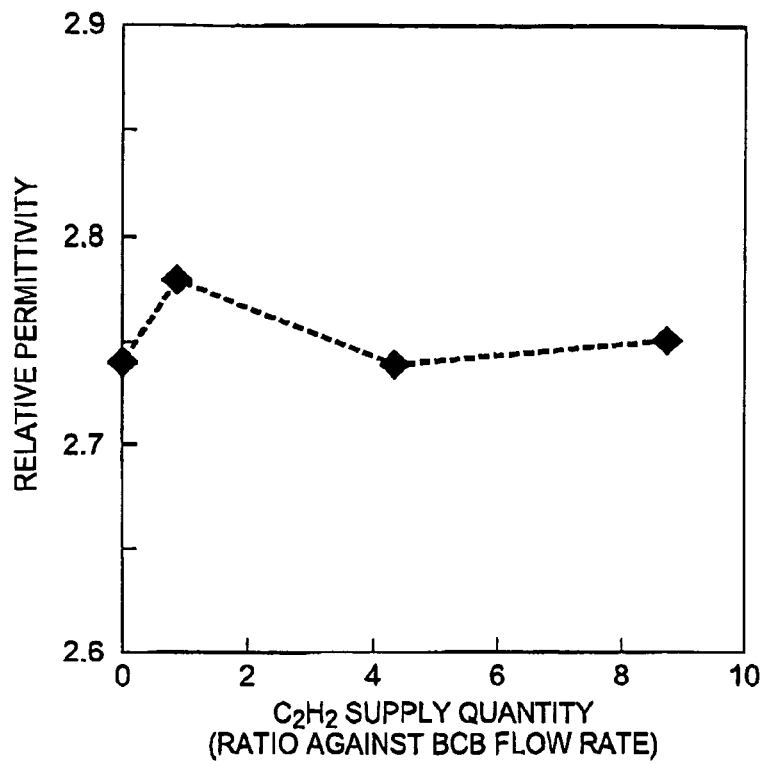
FIG. 6 is an explanatory view illustrating the effect of relative permittivity of Example-1 according to the present invention.
Figure 7:
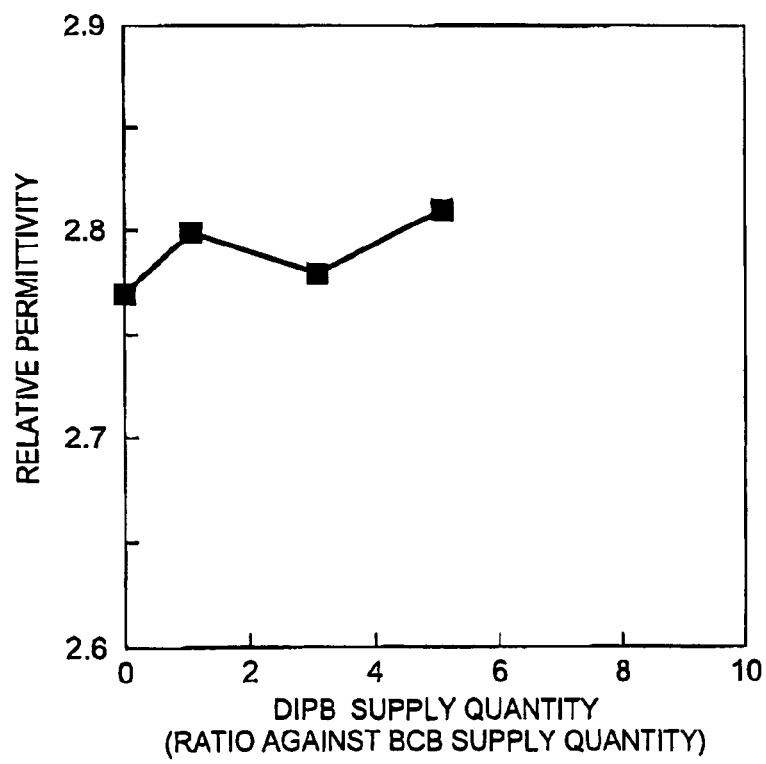
FIG. 7 is an explanatory view illustrating the effect of relative permittivity of Example-1 according to the present invention.
Figure 10:
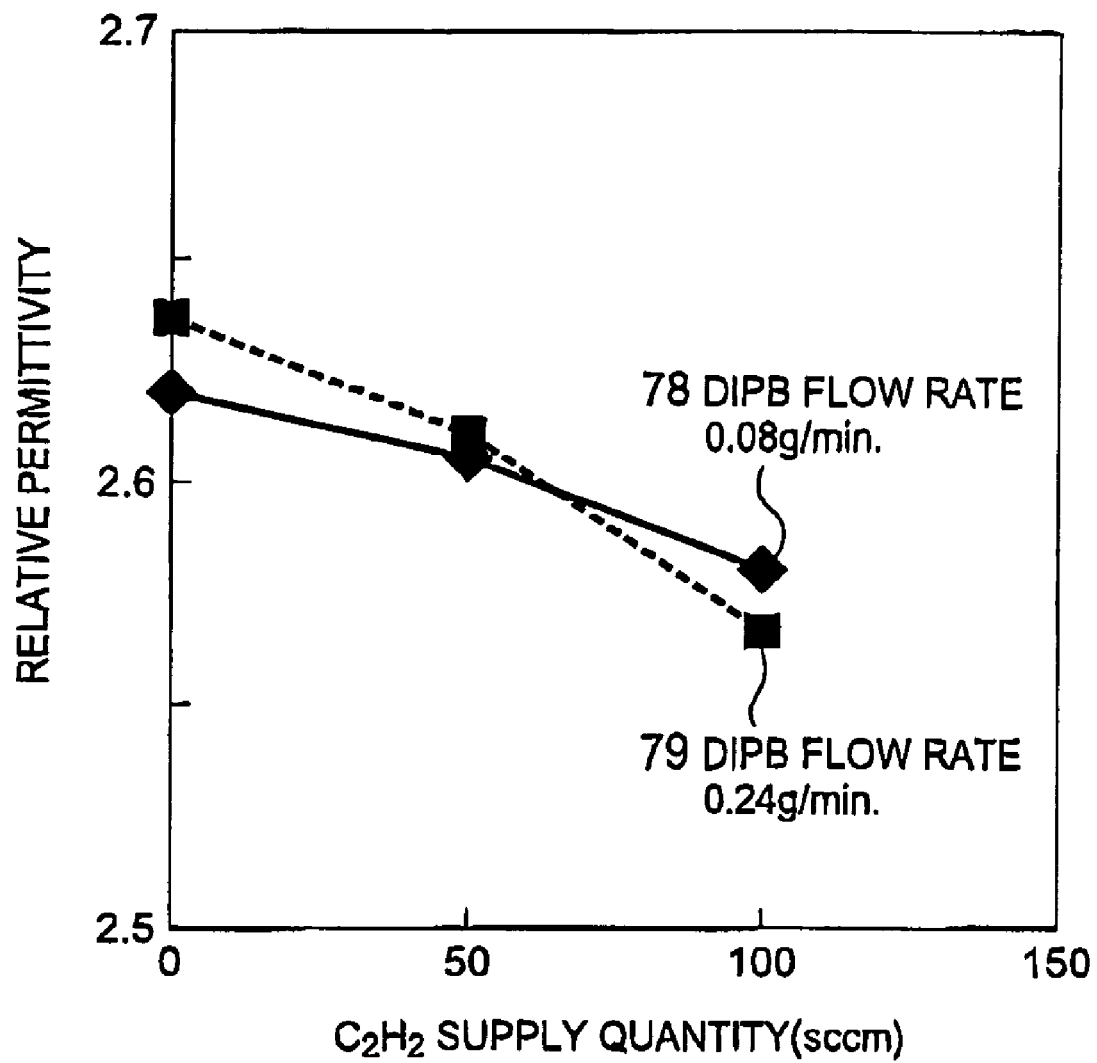

Meanwhile, as shown in FIG. 6, when two kinds of raw materials are used, specifically, if an amount of supply of acetylene increases against DVS-BCB (BCB), relative permittivity does not decrease. Further, as shown in FIG. 7, when two kinds of raw materials are used, specifically, if an amount of supply of only diisopropenyl benzene (DIPB) increases against DVS-BCB (BCB), relative permittivity does not decrease. However, as shown in FIG. 10, when an amount of supply of acetylene is increased against diisopropenyl benzene (DIPB), relative permittivity decreases in both cases of 0.08 g/min. (a solid Line 79) and 24 g/min. (a dashed Line 78). Therefore, an advantageous effect of the present invention resides in that using two kinds of raw materials of specific structures, or using more than three kinds of raw materials including the two kinds of organic compounds, a reduction in the relative permittivity can be surely achieved.

Also, the use of compounds having diisopropenyl group and the use of compounds having acetylene bond respectively result in an increase of mechanical strength and in an increase of film forming speed. Those compounds are in a complementary relationship to mutually compensate drawback of each compound, and hence simultaneous supply of those can promote improvement in the film characteristics.

Figure 8:
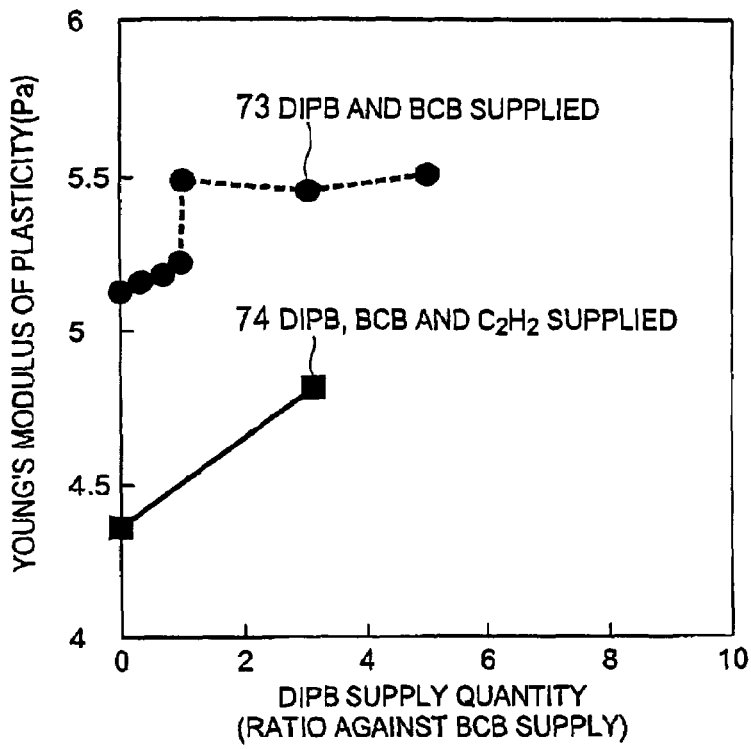
FIG. 8 is an explanatory view illustrating the effect to Young's modulus of elasticity of Example-1 according to the present invention.

Explained below referring to FIG. 8 is Young's Modulus of plasticity varying with amounts of supply of diisopropenyl benzene (DIPB).

FIG. 8 shows, in a solid line 74, the case using three kinds of organic compounds indicated in Example 1 and, in a dashed line 73, the case using two kinds of organic compounds, namely DVS-BCB (coded as BCB in FIG.) and diisopropenyl benzene (DIPB). Young's Modulus of plasticity decreases with addition of acetylene supply, however, mechanical strength can be increased with an increase in the supply amount of diisopropenyl benzene (DIPB).

Figure 9:
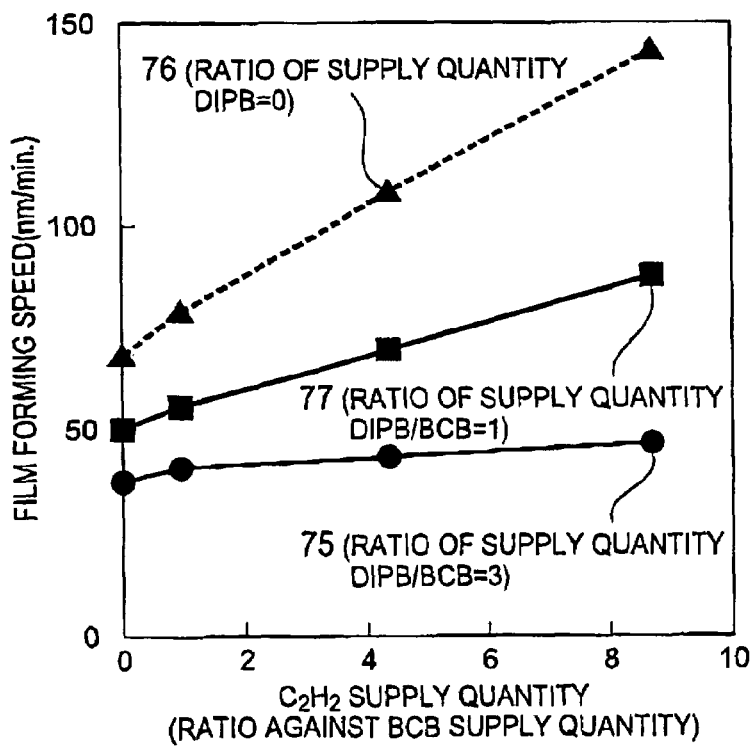
FIG. 9 is an explanatory view illustrating the effect to film-forming speed of Example-1 according to the present invention; and, FIG. 10 is an explanatory view illustrating the effect of relative permittivity of Example-1 according to the present invention.

Now, FIG. 9 illustrates the case of film forming speed varying with change in the supply amount of acetylene. In FIG. 9, solid line 75 indicates the case where the three kinds of organic compounds indicated in Example 1 are used, and a dashed line 76 indicates the case where the two kinds of organic compounds, namely DVS-BCB (coded as BCB in FIG.) and acetylene (C₂H₂) are used. Also, in FIG. 9, bold solid line 77 indicates the case where the ratio of amounts of supply of DVS-BCB (coded as BCB) and diisopropenyl benzene (coded as DIPB in FIG.) is 1, while, fine solid line indicates the case where the ratio of those supply amounts is 3. While the basic speed of film forming is reduced by addition of diisopropenyl benzene (DIPB), the speed of film forming can be increased with increasing of acetylene supply amount likewise the case of using two kinds of the raw materials.

In accordance with the present invention, not only the composite effect in case of using two kinds of the raw materials, but also a new effect by using three kinds of the raw materials, specifically, the effect of reduced relative permittivity, have been exhibited. Also, not only the reduced relative permittivity but Young's modulus of elasticity as well as the film forming speed also, which are important characteristics in manufacturing of semiconductor devices, can be improved to a practical level.

As explained above, the copolymerized high polymer films manufactured by the method covered by the present invention can be used as insulating films for semiconductor devices.

What is claimed is:

1. A copolymerized high polymer film manufactured by a vapor phase growth method, said copolymerized high polymer film comprising, as skeleton, a first organic monomer and a second organic monomer, the first organic monomer having plural isopropenyl groups, while the second organic monomer has an acetylene bond, wherein the first organic monomer comprises diisopropenyl benzenes, said diisopropenyl benzenes being indicated as the following Formula (I) and having a first polymerization reactive site, said first polymerization reactive site being an isopropenyl group

DIISOPROPENYLBENZENE.

(I)

2. The copolymerized high polymer film, according to claim 1, further comprising, as skeleton, a third organic monomer, each of the first, the second and the third organic monomers having unsaturated bonds capable of acting as reactive sites.

3. The copolymerized high polymer film, according to claim 2, wherein the second organic monomer comprises acetylene gas, said acetylene gas being indicated as the Formula (II) and having a second polymerization reactive site, said second polymerization reaction site being an acetylene bond

ACETYLENE (II)

4. The copolymerized high polymer film according to claim 1, wherein the first organic monomer comprises diisopropenyl benzene monomer, said diisopropenyl benzene monomer being illustrated as the foregoing Formula (I) and having a first polymerization reactive site, said first polymerization site being an isopropenyl group, the second organic monomer comprising acetylene gas, said acetylene gas being illustrated as the following Formula (II) and having a second polymerization reactive site, said second reaction site being an acetylene bond.

5. The copolymerized high polymer film, according to claim 2, wherein the third organic monomer is capable of causing copolymerization reaction by its molecules alone, and has no copolymerization reactive site comprising isopropenyl group and acetylene bond.

6. The copolymerized high polymer film according to claim 5, wherein the third organic monomer has, within its own molecule, a cyclic-ring structure capable of opening the ring, and an ethene-1,2-diyl(—CH=CH—) structure.

7. The copolymerized high polymer film according to claim 5, wherein the third organic monomer contains silicon atoms within its own molecule while at least one of the first and the second organic monomers is free from silicon atom within its own molecule.

8. The copolymerized high polymer film according to claim 5, wherein the third organic monomer comprises a siloxane bond within its own molecule.

9. The copolymerized high polymer film, according to claim 5, wherein the third organic monomer is divinylsiloxane bis-benzocyclobutene monomer, said divinylsiloxane bis-benzocyclobutene monomer being indicated as the following Formula (III) and having two kinds of third polymerization reactive sites, the two kind of the third polymerization reactive sites comprising a vinyl group and a cyclobutene group, respectively

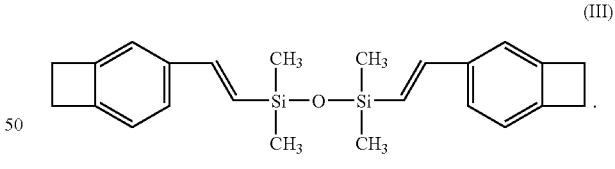

DIVINYLSILOXANE-BIS-BENZOCYCLOBUTENE (III)

10. The copolymerized high polymer film of claim 1 wherein the skeleton consists of more than two kinds of specially structured organic monomer containing said first and second organic monomers and existing in said copolymerized high polymer film as a permanent compound of the copolymerized high polymer film.

* * * * *